United States Patent
Zabel et al.

(10) Patent No.: US 7,238,547 B2
(45) Date of Patent: Jul. 3, 2007

(54) PACKAGING INTEGRATED CIRCUITS FOR ACCELERATED DETECTION OF TRANSIENT PARTICLE INDUCED SOFT ERROR RATES

(75) Inventors: Theodore H. Zabel, deceased, late of Yorktown Heights, NY (US); by Janes Jones, legal representative, Yorktown Heights, NY (US); Jerry D. Ackaret, Beaverton, OR (US); Michael A. Gaynes, Vestal, NY (US); Michael S. Gordon, Yorktown Heights, NY (US); Nancy C. LaBianca, Yalesville, CT (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 11/098,343

(22) Filed: Apr. 4, 2005

(65) Prior Publication Data
US 2006/0220654 A1    Oct. 5, 2006

(51) Int. Cl.
*H01L 21/56*    (2006.01)
(52) U.S. Cl. .......... 438/108; 438/17; 438/123; 438/124; 438/127; 257/E23.117
(58) Field of Classification Search ........... 438/17, 438/108, 123, 124, 127; 257/E23.117
See application file for complete search history.

(56) References Cited

U.S. PATENT DOCUMENTS

| 5,533,036 A | 7/1996 | Blake et al. ............ 371/40.1 |
| 5,539,203 A | 7/1996 | Ohdomari ............ 250/492.21 |
| 5,948,922 A * | 9/1999 | Ober et al. ............ 549/547 |

(Continued)

FOREIGN PATENT DOCUMENTS

| JP | 116941 A | 7/1989 |
| JP | 2003100904 A | 2/2003 |

OTHER PUBLICATIONS

"Hybrid Cooling With Cycle Steering In The IBM eServer z990", G.F. Goth, D.J. Kearney, U. Meyer, D. W. Porter; IBM J. Res. & Dev., vol. 48, No. 3/4, May/Jul. 2004, pp. 409-423.

"A New Comprehensive SRAM Soft-Error Simulation Based On 3D Device Simulation Incorporating Neutron Nuclear Reactions", M. Hane, Y. Kawakami, H. Nakamura, T. Yamada, K. Kumagai, Y. Watanabe; 0-7803-7826-1/03 2003 IEEE, pp. 239-242.

*Primary Examiner*—George Fourson
(74) *Attorney, Agent, or Firm*—Eugene I. Shkruko, Esq.; Jill M. Breedlove, Esq.; Heslin Rothenberg Farley & Mesiti P.C.

(57) ABSTRACT

An IC device is packaged for accelerated transient particle emission by doping the underfill thereof with a transient-particle-emitting material having a predetermined, substantially constant emission rate. The emission rate may be tunable. In one aspect, a radioactive adhesive composition is provided for bonding a semiconductor device to a chip carrier. The radioactive adhesive composition is made from a cured reaction product including a resin and a filler, and may be reworkable or non-reworkable. Either the resin or the filler, individually or both together as a mix, are doped substantially uniformly with the transient-particle-emitting material, thereby putting the transient-particle-emitting in close proximity with the IC to be tested. The underfill is formulated to have a stable chemistry, and the doped particles are encapsulated, so as to contain the emissions. Accelerated transient-particle-emission testing may then be performed on the IC in situ to provide accelerated detection of soft errors.

20 Claims, 4 Drawing Sheets

U.S. PATENT DOCUMENTS

| | | | |
|---|---|---|---|
| 5,973,033 A * | 10/1999 | Ober et al. | 523/443 |
| 5,990,564 A * | 11/1999 | Degani et al. | 257/778 |
| 6,197,122 B1 * | 3/2001 | Ober et al. | 34/2 |
| 6,274,473 B1 * | 8/2001 | Blish et al. | 438/612 |
| 6,507,511 B1 | 1/2003 | Barth, Jr. et al. | 365/154 |
| 6,708,284 B2 | 3/2004 | Smith | 714/10 |
| 6,711,703 B2 | 3/2004 | MacLaren et al. | 714/704 |
| 6,715,116 B2 | 3/2004 | Lester et al. | 714/718 |
| 7,084,660 B1 * | 8/2006 | Ackaret et al. | 324/765 |
| 2004/0164409 A1 * | 8/2004 | Schammler et al. | 257/734 |
| 2007/0032065 A1 * | 2/2007 | Porter et al. | 438/613 |

* cited by examiner

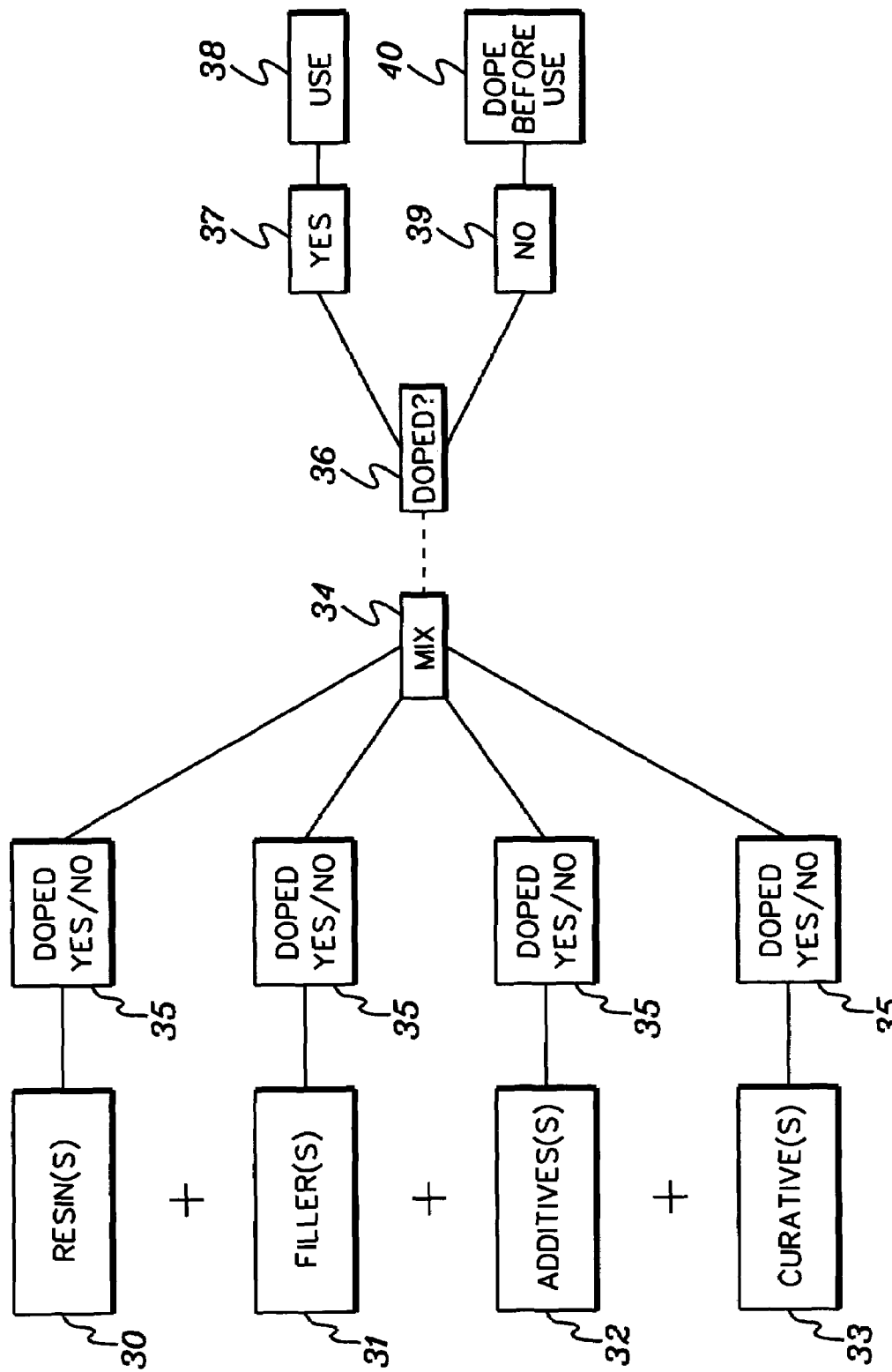

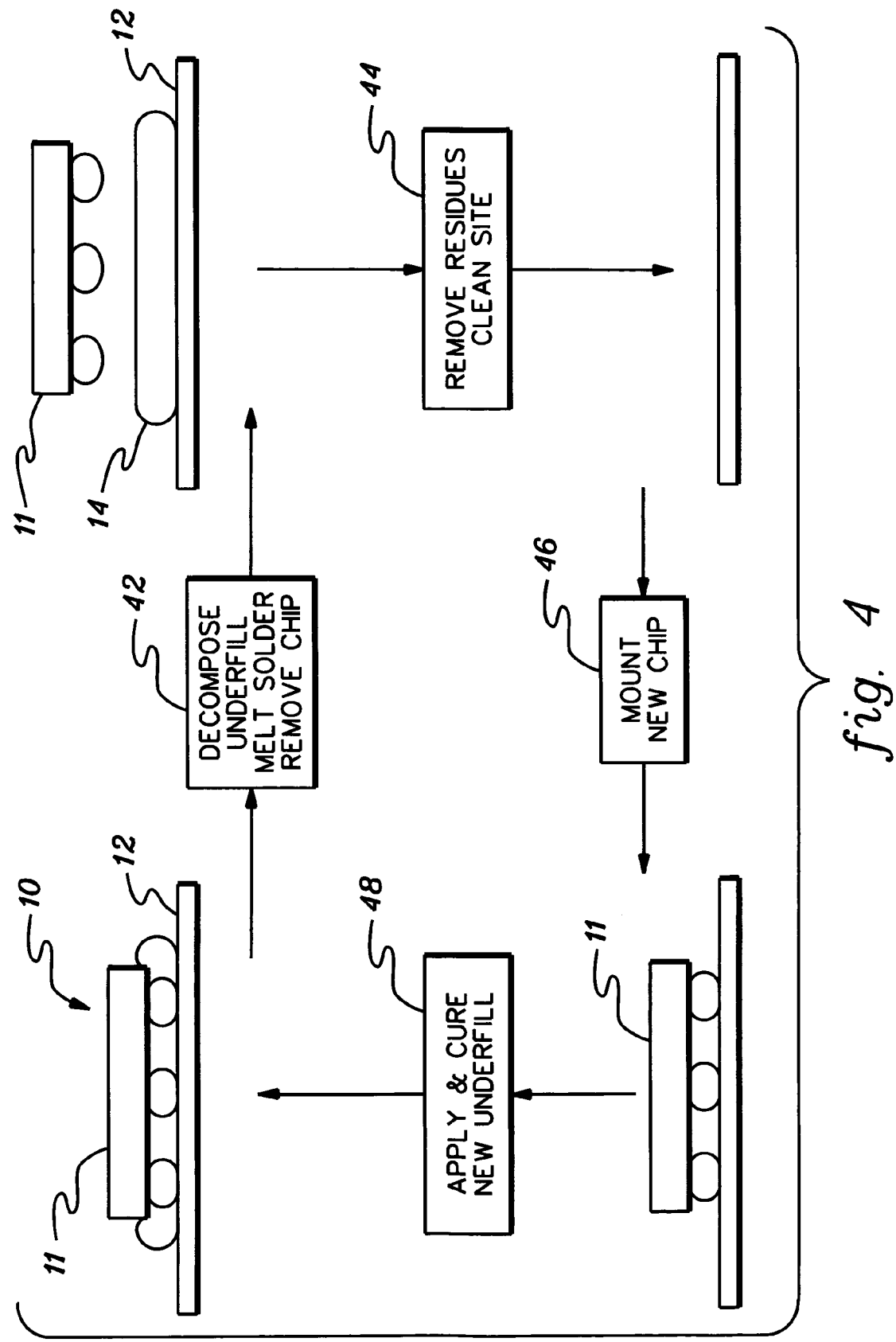

PACKAGING INTEGRATED CIRCUITS FOR ACCELERATED DETECTION OF TRANSIENT PARTICLE INDUCED SOFT ERROR RATES

CROSS REFERENCE TO RELATED APPLICATIONS

This application is related to U.S. patent application Ser. No. 11/098,104 (POU9-2004-0174), assigned to the instant assignee, filed concurrently herewith and incorporated by reference herein.

TECHNICAL FIELD

This invention relates generally to detection of soft errors in electronic systems and, more particularly, to packaging integrated circuits, including logic circuits and array circuits, for accelerated testing of soft error rates due to errors caused by ionizing particle emission.

BACKGROUND OF THE INVENTION

Accurate estimates of soft error rates (SER's) in computer systems are desirable for the implementation of reliable systems. Soft errors are caused by single-event upsets (SEU's), which are random, isolated events that can be caused by passage of cosmic rays or transient ionizing particles, such as alpha particles. That is, ionizing particles can generate enough free charge to flip a structure or device to its opposite state. In an integrated circuit (IC) chip package, emission of trace amounts of radioactive impurities is one cause of SEU's. For wire-bonded structures, accelerated testing using a radioactive source of alpha particles is straightforward. In particular, a source of alpha particles with a known emission rate, such as, for example, a thorium foil, may be easily positioned adjacent to the wire-bonded chip with little energy loss as viewed from the source to the chip.

Unfortunately, however, for integrated circuits (IC's) that use, for example, solder bumps or balls, such as controlled collapsible chip connections (herein referred to as solder bumps), the chip-to-substrate gap is too small (e.g., on the order of 100 microns or less) to allow access by a hand-held radioactive source. Furthermore, the substrate blocks any access to the semiconductor device by a radioactive source, handheld or otherwise. Moreover, the range of alpha particles is substantially smaller than the thickness of the substrate, such that the alpha particles emitted from an external source cannot reach the semiconductor device. Typically, a low alpha emission underfill is inserted into the gap in order to stabilize the solder bond and act as a shield or block for any alpha particles that may emanate from the substrate or carrier.

Eliminating lead from the solder bumps reduces, but does not eliminate, the alpha radiation to the chip. Other sources of alpha particles may be, for example, trace amounts of thorium in chip materials that have been produced from mined ores. In addition, alpha particles from packaging materials, or solder bumps, add to, or compete with, neutron-induced soft errors caused by the liberation of charged particles when atmospheric neutrons strike silicon or other materials surrounding the chips. Disadvantageously, soft errors occur with greater frequency with advances in CMOS technology, for example; i.e., as dimensions get smaller, densities increase, and bias voltages become lower. Furthermore, while soft errors in caches and other static random access memory (SRAM) arrays can be detected and corrected with the aid of error correction codes (ECC's), for example, this is not the case for soft errors in logic circuits.

A current method for estimating soft error rates (SER's) is to add the soft error contributions from each circuit element. To this end, derating factors need to be estimated, and these are affected by, for example, SEU's in a portion of an IC that is not being used, or a node that is a logical off state. Unfortunately, therefore, these derating factors are difficult to estimate. Furthermore, relying on measurements from systems being tested in the field necessitates delays in acquisition of SER information until after a product is made.

Accordingly, it is desirable to provide a technique for packaging IC's to enable accelerated detection, in situ, of SER's due to transient particle emission.

SUMMARY OF THE INVENTION

The shortcomings of the prior art are overcome and additional advantages are provided through packaging integrated circuits (IC's) for accelerated detection of SER's due to transient particle emission. An IC device is packaged for accelerated transient particle emission by doping the underfill thereof with at least one transient-particle-emitting material having a predetermined, substantially constant emission rate. In one aspect, a radioactive adhesive composition is provided for bonding a semiconductor device to a chip carrier, i.e., a structure which holds a chip and which is used to facilitate its placement on a substrate. The radioactive adhesive composition comprises a cured reaction product comprising a resin and filler material(s), and may be reworkable or non-reworkable. Either the resin or the filler, individually or both together as a mix, are doped substantially uniformly with the transient-particle-emitting material, thereby putting the transient-particle-emitting material in close proximity with the IC to be tested. The underfill is formulated to have a stable chemistry, and the doped particles are encapsulated, so as to contain the emissions. Accelerated transient-particle-emission testing may then performed on the IC in situ. Advantageously, therefore, SER's due to soft errors may be detected, and a quantitative measurement of the SER may be determined therefrom.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 depicts a process flow for doping the underfill to provide an HUF in accordance with an aspect of the present invention; and FIG. 4 depicts a reworkable underfill process flow in accordance with an aspect of the present invention.

BEST MODE FOR CARRYING OUT THE INVENTION

Presented herein is a technique for packaging IC's for accelerated detection of SER's due to transient-particle emission in integrated circuits (IC's), including, but not limited to, logic circuits. Logic circuits are defined herein as comprising all structures on an IC apart from SRAM arrays, including but not limited to, combinatorial logic, latches in the logic paths, register files, buffers, and input/output circuits.

Figure 1:
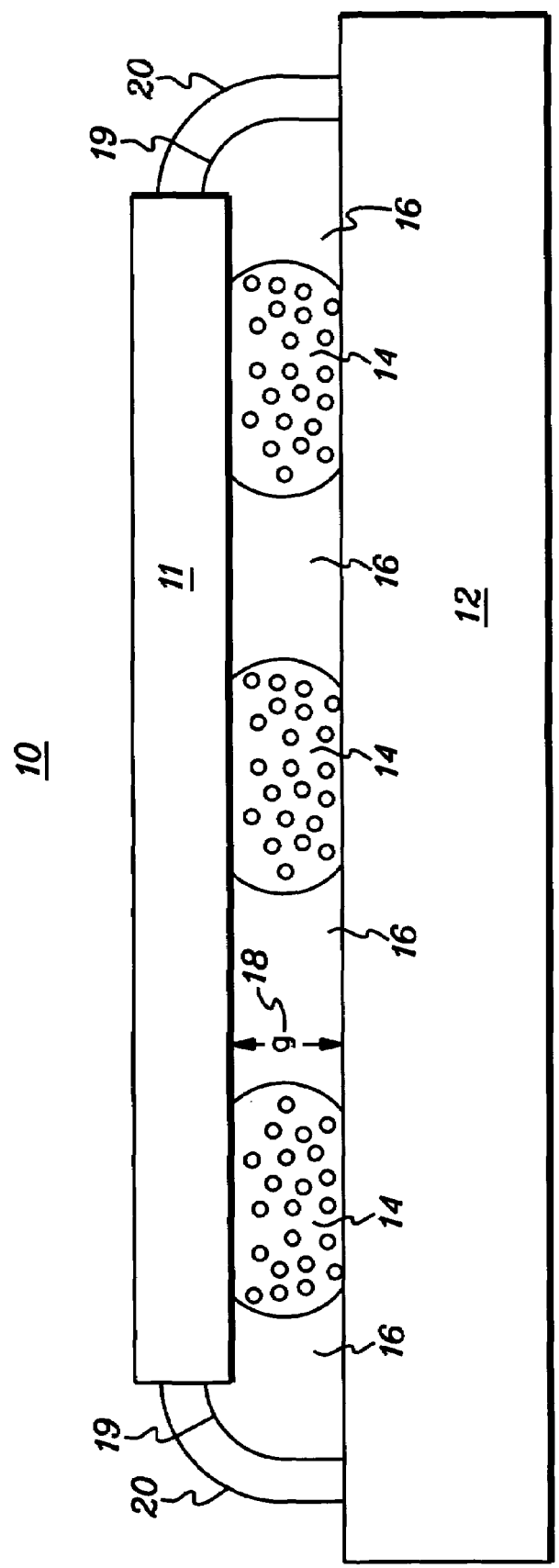
FIG. 1 depicts an integrated circuit (IC) chip having a hot underfill in accordance with an aspect of the present invention.

In accordance with an aspect of the present invention, an IC device is packaged for accelerated transient particle emission by doping the underfill thereof with at least one transient-particle-emitting material having a predetermined, substantially constant emission rate, the doped underfill being referred to herein as a "hot underfill" or "HUF". FIG. 1 illustrates an exemplary IC device 10 comprising a chip 11 attached to a carrier substrate 12 using, for example, bonds 14 and having a doped underfill 16 in accordance with an aspect of the present invention. A gap (g) 18 between the active chip surface and the carrier substrate surface is typically on the order of about, for example, 100 microns. (An exemplary range for the gap may be on the order of 5–125 microns.) The radioactive underfill, or hot underfill, is formulated to flow into the gap between the chip and carrier by, for example, capillary flow, such that the gap is substantially completely filled, forming a substantially void-free film. The flow characteristics of the hot underfill are such that fillets 19 form from the horizontal carrier surface and climb, or extend above, the vertical thickness of the chip edge.

In preferred embodiments, the volume and surface area of radioactive fillets 19 are reduced in order to minimize emission of radioactive particles to the ambient. A vacuuming or wicking process may be employed to reduce the fillet. In a vacuuming process, for example, a standard pressure feed fluid dispense tool is used in a vacuum pick-up mode to pick up the radioactive underfill fillet. Alternatively, in a wicking process, an exemplary wicking fabric, such as a lint-free clean room cloth, is used to contact the radioactive underfill, which is picked up through wicking action.

After radioactive fillet 19 is substantially reduced in size, a soft-cure, or B-stage cure, is completed to solidify the radioactive underfill. Next, a cold, or undoped underfill material (CUF) 20, that is preferably chemically compatible with the hot underfill, is dispensed over the remaining, substantially reduced-in-size HUF fillet in order to encapsulate it and provide a cover barrier to the radioactive underfill. The underfill is then fully cured, resulting in a structure with any exposed HUF being protected from surface abrasion or erosion by CUF fillet 20, resulting in reduced radioactive emissions to the ambient.

An exemplary underfill comprises a silica filler. A filler material may be electrically conductive or non-conductive, or thermally conductive. An exemplary doped underfill in accordance with an aspect of the present invention comprises radioactive lead or polonium, or a mixture of both, contributing an accelerated alpha-particle emission rate compared to standard IC packaging materials. By way of example, an HUF formulation having an alpha particle emission rate of approximately 1E6 alpha particles/cm$^2$/khr was used for demonstration. For this example, if the alpha particle flux from packaging materials, such as solder, were 20 alpha particles/cm$^2$/khr, the introduction of HUF would provide an acceleration factor of over 50,000.

Those skilled in the art will recognize that the energy distribution and flux of the HUF could be measured with a silicon surface barrier type detector (not shown). Furthermore, a plurality of silicon surface barrier type detectors could be employed for measuring the uniformity of alpha particle activity across the integrated circuit.

The gap 18 between the substrate 12 and the semiconductor 11 is typically on the order of, for example, 100 microns, as indicated hereinabove. The range of alpha particles from $^{210}$Po (5.3 MeV) in most fillers is on the order of approximately 35 microns. Therefore, when an underfill is doped with an alpha particle emitting isotope, the source appears to be "thick", and the alpha particles advantageously emerge from the filler at the semiconductor side with a broad distribution of energies. This is opposed to a mono-energetic distribution, which would otherwise occur if the doped region were substantially thinner than the alpha-particle range, or if all the radioactive material were segregated on the chip surface.

Figure 2:
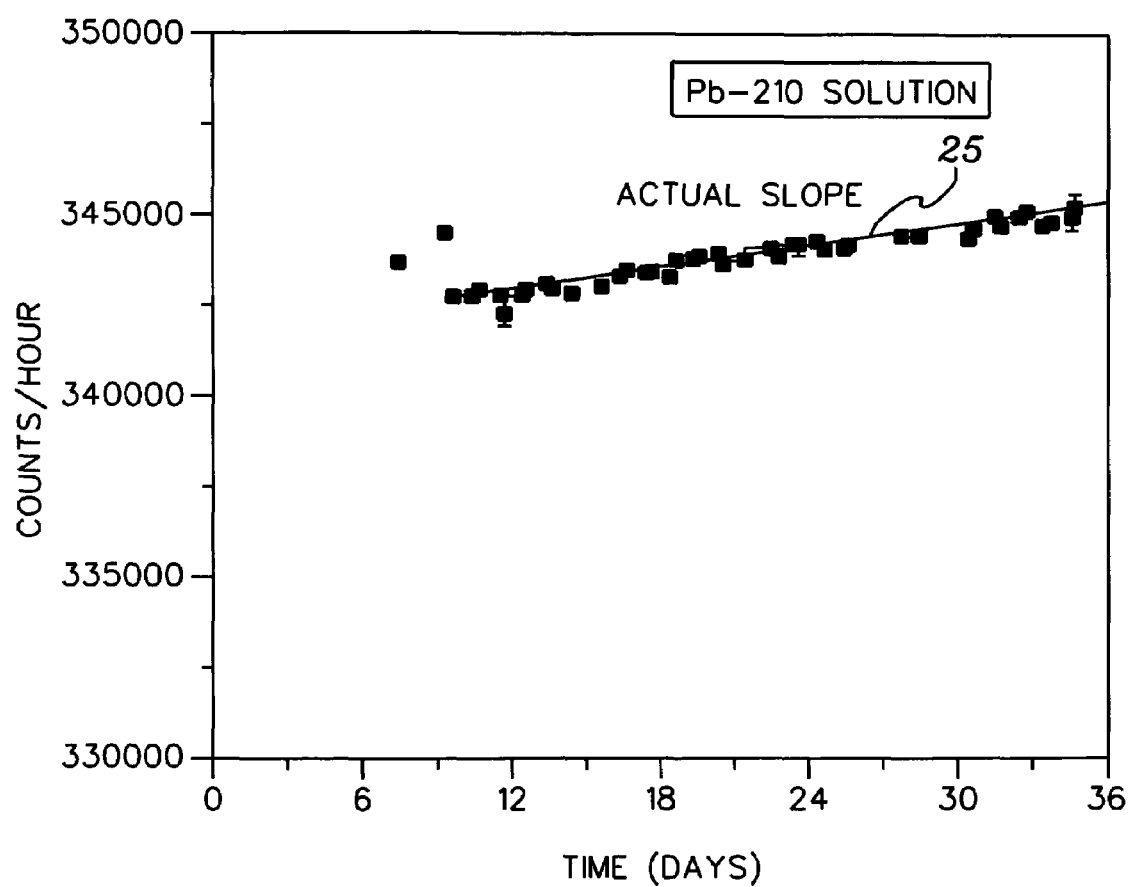
FIG. 2 depicts an alpha particle emission rate as a function of time for an exemplary radioactive, or hot, underfill (HUF)

In accordance with an aspect of the present invention, the emission rate of the hot underfill is substantially constant over a predetermined period of time. To this end, the HUF is doped with an appropriate alpha-particle-emitting material or other radioactive source that provides a substantially constant particle emission rate. In particular, the emission rate does not substantially increase or decrease, and thus does not approach an exponential rate. An exemplary substantially constant alpha particle emission rate may have, for example, a 10% or less variation in flux per month. FIG. 2 illustrates an alpha particle emission rate as a function of time for an exemplary HUF. The data points in FIG. 2, collectively depicted by line 25, demonstrate a substantially constant emission of alpha particles from this exemplary HUF. Other suitable emission sources may comprise, for example, thorium, plutonium, uranium, bismuth, etc., i.e, any of either the natural occurring radioactive sources or manmade isotopes or mixtures thereof, depending on the desired emitted transient particle energy and flux.

By way of example, alpha particles from $^{210}$Po emitted from solder bumps can be a major source of SER for IC's. In accordance with one aspect of the present invention, an underfill comprising $^{210}$Po is provided in order to duplicate the alpha-particle range distribution of the solder bumps. The half-life of $^{210}$Po (138 days) is too short for the duration of most experiments so a mixture with $^{210}$Pb is provided to generate a nearly constant emission rate.

In another aspect of the present invention, one or more components of the underfill may be doped to be radioactive either separately or as a combination. FIG. 3 illustrates alternative processes for doping one or more of the underfill components or a combination thereof. In particular, FIG. 3 shows in blocks 30–33 the underfill components: resin 30, filler(s) 31, additive(s) 32, and curative(s) 33; and block 34 represents the mix of underfill components. Blocks 35 determine whether each component has been individually doped; and block 36 determines whether the mixture of components has been doped. For example, either the resin, the filler, an additive, or a curative portion may be doped before final formulation of the underfill, with either the same or a different dopant. If one or more components or the mixture thereof has been doped (block 37), then block 38 shows that the HUF is ready for use in an IC. If not (block 39), then block 40 indicates that doping may be alternatively applied to the completed mixture of underfill components before application to the IC.

EXAMPLE

HUF is applied to an IC. The fillet 19 (FIG. 1) is vacuumed out; and the chip edges are cleaned with acetone to remove any HUF not contained under the chip. The device is then soft-cured at 85° C. for 60 minutes. The surface radioactivity, i.e., the alpha-particle emission rate in counts per hour, is then measured. CUF is applied to form a new fillet 20 around the chip, encapsulating any exposed HUF. Hard curing is performed at 150° C. for 120 minutes; and the alpha particle emission rate is measured.

The method of doping the underfill of an IC for accelerated SER detection in accordance with an aspect of the present invention may be extended to other radioactive isotopes, such as, for example, thorium or uranium, to mirror the flux and alpha-particle energy distribution from real packaging materials because there might be impurities in materials such as mined silica.

In another aspect of the present invention, the transient particle emission rate may be tunable by adjusting the ratios of the radioactive isotopes, e.g., $^{210}$Po and $^{210}$Pb that are mixed together in the underfill.

FIG. 4 illustrates a process by which an underfill is removed and reworked, allowing the chip or substrate to be recovered. The upper left portion of FIG. 4 shows the chip 11 bonded to the substrate 12. Then, as illustrated in block 42, underfill 14 is decomposed, and the solder is melted. The substrate 12 is removed and cleaned of residues are removed, as indicated in block 44. A new chip is mounted, as indicated in block 46; and the underfill process is repeated, as indicated in block 48.

Those skilled in the art will recognize that permutations of the process using a reworkable underfill are possible. For example, underfills exhibiting different activities or energy distributions could be used to test the same chip. Alternatively, the same underfill formulation could be used with different chips for testing.

Advantageously, the packaging technique described hereinabove allows for accelerated transient-particle emission testing in situ on IC 10, i.e., without necessitating delays due to field testing. In particular, the hot underfill (HUF) allows for accelerated testing for transient-particle-induced (e.g., alpha-particle-induced) SER events at the system level, board level, chip level, or any combination thereof. The test type may be of any suitable form comprising, for example, actual application programs and data; programs and data that simulate applications or test cases; test programs that are intended to stress certain desired cases, functions, or parts of a system; a built-in self-test; static tests that read in 1's and 0's, then wait, and then read out the results and detect the SER's. For each test type, the result can be tested for upsets by either detecting a system crash; detecting an error through detection circuitry, such as a parity checker; comparing the resulting data stream to the expected data stream; comparing duplicate structures; residue checking; or any other suitable method. When the results are read out, they are counted to form a SER per circuit, or per bit, as desired.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for packaging an integrated circuit comprising at least one chip and a substrate, the method comprising:
   doping an underfill, comprising a plurality of components, with at least one transient-particle-emitting material having a predetermined, substantially constant emission rate; and
   applying the doped underfill to the integrated circuit.

2. The method of claim 1, wherein the at least one transient-particle-emitting material comprises at least one radioactive isotope, and wherein the emission rate is tunable by adjusting radioactivity of the at least one radioactive isotope, or by adjusting ratios of the radioactive isotopes.

3. The method of claim 1, wherein at least one of the plurality of components is doped with a transient-particle-emitting material.

4. The method of claim 1, wherein the plurality of components of the underfill are combined, and the combined components are doped with a transient-particle-emitting material.

5. The method of claim 1, wherein the at least one transient-particle-emitting material comprises at least one alpha-particle-emitting material.

6. The method of claim 5, wherein the at least one alpha-particle-emitting material is selected from a group consisting of naturally occurring isotopes, manmade isotopes, or combinations thereof.

7. The method of claim 1, wherein the doping comprises a reworkable underfill doping process, comprising decomposing an existing underfill and replacing the existing underfill with the doped underfill.

8. The method of claim 1, wherein the integrated circuit further comprises a gap between the at least one chip and the substrate, and wherein applying the doped underfill comprises filling the gap by capillary flow.

9. The method of claim 1, wherein the underfill comprises a resin and a filler.

10. The method of claim 1, wherein the underfill comprises an adhesive component.

11. The method of claim 1, further comprising minimizing any amount of the doped underfill exposed to the ambient.

12. The method of claim 11, wherein minimizing exposed doped underfill comprises wicking away exposed doped underfill with an absorbent material.

13. The method of claim 11, wherein minimizing exposed doped underfill comprises vacuum removal of exposed doped underfill.

14. The method of claim 11, wherein minimizing exposed doped underfill comprises encapsulating the doped underfill with a cold underfill.

15. The method of claim 1, further comprising providing a silicon surface barrier type detector for measuring alpha particle flux and energy distribution.

16. The method of claim 1, further comprising providing a plurality of silicon surface barrier type detectors for measuring uniformity of alpha particle activity across the integrated circuit.

17. The method of claim 1, further comprising measuring accelerated soft error rate testing in situ.

18. The method of claim 1, further comprising forming a substantially void-free bond with the doped underfill between the chip and the substrate.

19. An integrated circuit packaged for accelerated soft error rate detection, comprising:

at least one chip attached to a carrier substrate and having a gap therebetween, the gap being filled with an underfill doped with at least one transient-particle-emitting material having a predetermined, substantially constant emission rate.

20. The integrated circuit of claim 19, wherein the at least one transient-particle-emitting material comprises at least one radioactive isotope, and wherein the emission rate is tunable by adjusting radioactivity of the at least one radioactive isotope, or by adjusting ratios of the radioactive isotopes.

\* \* \* \* \*